(12) United States Patent
Nanis

(10) Patent No.: US 6,977,030 B2
(45) Date of Patent: Dec. 20, 2005

(54) METHOD OF COATING SMOOTH ELECTROLESS NICKEL ON MAGNETIC MEMORY DISKS AND RELATED MEMORY DEVICES

(76) Inventor: Leonard Nanis, 2114 Rosswood Dr., San Jose, CA (US) 95124

( * ) Notice: Subject to any disclaimer, the term of this patent is extended or adjusted under 35 U.S.C. 154(b) by 115 days.

(21) Appl. No.: 09/894,375

(22) Filed: Jun. 27, 2001

(65) Prior Publication Data

US 2002/0061424 A1  May 23, 2002

Related U.S. Application Data

(60) Provisional application No. 60/252,365, filed on Nov. 21, 2000.

(51) Int. Cl.[7] .......................... C23C 14/35; C23C 16/00
(52) U.S. Cl. ............................. 204/192.15; 204/192.2; 427/129; 427/131; 427/132
(58) Field of Search ...................... 204/192.15, 192.16, 204/192.7, 192.2; 427/131, 132, 129

(56) References Cited

U.S. PATENT DOCUMENTS

| | | | |
|---|---|---|---|
| 4,929,499 A | 5/1990 | Shadzi et al. ................. 428/336 |
| 5,221,459 A | 6/1993 | Okano et al. | |
| 5,316,844 A | 5/1994 | Suzuki et al. ................. 428/323 |
| 5,388,020 A * | 2/1995 | Nakamura et al. ........... 360/135 |
| 5,405,646 A | 4/1995 | Nanis .......................... 427/131 |
| 5,466,481 A | 11/1995 | Nishikawa et al. .......... 427/130 |
| 5,569,506 A | 10/1996 | Jahnes et al. ............... 428/65.3 |
| 5,741,560 A | 4/1998 | Ross ............................ 427/555 |
| 5,747,135 A | 5/1998 | Chakrabarti et al. ........ 428/64.1 |
| 5,871,810 A | 2/1999 | Starcke et al. ............... 427/226 |
| 5,900,296 A | 5/1999 | Hayashi et al. ............. 428/64.1 |
| 5,980,997 A | 11/1999 | Ross et al. ................... 427/555 |
| 6,030,681 A | 2/2000 | Czubarow et al. .......... 428/65.3 |
| 6,036,824 A | 3/2000 | Hedgcoth ............... 204/192.16 |
| 6,042,939 A | 3/2000 | Takahashi .................... 428/332 |
| 6,106,927 A | 8/2000 | Zhong et al. ................ 428/141 |
| 6,123,603 A | 9/2000 | Tada et al. ..................... 451/37 |
| 6,143,375 A | 11/2000 | Ross et al. ................... 427/555 |
| 6,316,097 B1 * | 11/2001 | Liu et al. ..................... 428/332 |

FOREIGN PATENT DOCUMENTS

WO   WO 94/15720   7/1994

OTHER PUBLICATIONS

Bhushan, Bharat, "Solid Surface Characterization," Introduction to Tribology, Chapter 2, Copyright 2002, John Wiley & Sons, 9-11.

Samuels, L.E., "Principles of Technique Selection in Mechanical Polishing," Metals Handbook, vol. 8, 8th Edition, Copyright 1973, American Society for Metals, 14-26.

(Continued)

Primary Examiner—Rodney G. McDonald
(74) Attorney, Agent, or Firm—Mark A. Haynes; Haynes Beffel & Wolfeld LLP

(57) ABSTRACT

A method of manufacture of thin film magnetic disks and other useful articles of similar planar geometry in which a non-magnetic layer is first deposited on one or both sides of the disk or article substrate to mask chemical and mechanically induced heterogeneities introduced by pre-polishing to achieve a smooth finish, typically resulting in cold-working of the surface, and to also bind to the substrate and is then coated with a thin layer of metal selected to either reactively or catalytically initiate smooth, electroless deposition of a non-magnetic nickel alloy which is subsequently polished and coated with additional thin layers to provide magnetic read-write capability. A disk drive using one or more of such disks is provided.

14 Claims, 7 Drawing Sheets

OTHER PUBLICATIONS

Gawrilov, G.G., "Chemical (Electroless) Nickel Plating," 1979, Porcullis Press, 118-119.

Final Office Action mailed Jun. 16, 2005 for U.S. Appl. No. 10/427,158, 9 pages.

Interview Summary mailed Jul. 13, 2005, 4 pages.

Amendment/Response Under 37 C.F.R. 1.132 with Exhibits A-G, Jul. 25, 2005, 41 pages, Filed in child 10/427,158, Reviewed from 10/427,158.

* cited by examiner

*(PRIOR ART)*
FIG.—1

METHOD OF COATING SMOOTH ELECTROLESS NICKEL ON MAGNETIC MEMORY DISKS AND RELATED MEMORY DEVICES

CLAIM OF BENEFIT OF PROVISIONAL APPLICATION

The present application claims the benefit under 35 U.S.C. 119(e), and all other available benefits, of prior U.S. Provisional Application No. 60/252,365; filed 21 Nov. 2000; entitled Method of Coating Electroless Nickel On Magnetic Memory Disks and Related Memory Devices; invented by Leonard Nanis, which is incorporated by reference as if fully set forth herein.

BACKGROUND OF THE INVENTION

1. Field of the Invention

This invention relates generally to thin film magnetic memory disks and related planar devices; and to a procedure for their manufacture which permits the use of less expensive materials than prior art, simultaneously greatly reduces the use of process water and chemicals, and also greatly reduces the need for the treatment and disposal of waste chemicals.

2. Description of Related Art

Hard magnetic disks are used to store digital information utilized for data processing. An advantage of such a disk is that it can provide high-speed random access. That is, one can either write or retrieve information from any selected area on the magnetic memory surface without having to serially traverse the full memory space of the disk. Generally, a hard magnetic disk is mounted within a disk drive which is akin to a record turntable in that it includes means for rotation of the disk and means for translating a head across the surface of the disk to provide access to a selected annular track. Typically, a plurality of disks are mounted on a single spindle in spaced relationship to one another and heads are provided to interact through their magnetic fields with oppositely close planar surfaces of each of such disks. With high density data storage made possible by the use of newer design heads and close flying heights, a single head and single disk surface may suffice for some applications. For planar magnetic storage devices such as cards, direct sliding contact by the head may be preferred.

The hard disks now available for memory applications are typically coated with a magnetic storage layer. Each of the disk surfaces which receives and stores information has a thin layer of magnetic material carried by a substrate. The heads which interact with each of the surfaces are so-called "flying" heads i.e., they do not touch the surface of the disk during its rotation—rather, they ride on an air film which acts as a bearing between the disk and the head. The head typically includes a magnetic coil to permit interacting with the magnetic film through the intervening air film space. The air film prevents wear of the head and the thin magnetic layer on the disk surface which would otherwise be caused by a contact between the head and the surface film. Other devices based on magnetic memory storage may not require an air bearing but may instead utilize a head which contacts the magnetic layer in a linear sliding manner.

Details of the construction of thin film magnetic media are given in U.S. Pat. No. 5,405,646 and are included herein for reference. Media are built up in layers, each of which performs a specific task. As shown in FIG. 1, the basis metal of the disk is generally an aluminum alloy, typically 0.030 inches thick for 2 inch diameter disks or 0.050 inches for 3.5 inch diameter disks. Disk alloys generally contain about 4 to 5 weight percent magnesium to add strength to the disk. Because these alloys are soft, a hard surface is built up by adding a coating of nickel-phosphorus alloy (88Ni-12P, weight percent basis as a typical example) by the immersion process known as electroless nickel plating.

(Note: The designation of a commonly encountered electroless nickel composition as 88Ni-12P (on a weight percentage basis) is used herein to avoid any ambiguity, but is not intended to be limiting, since the frequently used "NiP" suggests equiatomic nickel and phosphorus i.e. a compound rather than an alloy.)

The 88Ni-12P layer is typically 300 microinches thick after polishing to obtain a smooth surface. The hard 88Ni-12P layer is a firm base which provides support to much thinner subsequently added magnetic layers. The 88Ni-12P resists mechanical damage which might be caused by inadvertent contact impacts between the head and disk surface, also known as "head slap".

As head flying or glide heights have been lowered to one microinch or less to accommodate increased data density, the aluminum alloy substrate itself has recently been given initial polishing to minimize surface roughness. The premise for pre-polishing of the substrate is that a smooth starting surface for the substrate will yield a smooth 88Ni-12P deposit. However, the mechanical pre-polishing action tends to produce regions at the substrate surface which, although mechanically smooth, may respond unevenly in the wet chemical steps which condition the substrate for electroless nickel plating according to the prior art.

The uneven response of the highly polished substrate has been termed "carpeting" or "wall" effect and is believed to be the result of cold-working of the soft aluminum alloy. Even without pre-polishing, aluminum alloy substrates become roughened as a result of etching during immersion in prior art pre-treatment baths. The "carpeting" effect adds further roughening. The exact mechanism which causes carpeting is not well understood, particularly in the way that mechanical cold work influences chemical behavior. There is presently no theoretical or experimental evaluation known to applicant of an inherent difference in electrochemical activity between stressed and unstressed aluminum alloy. Further, the growth (and dissolution) of the ever-present thin layer of aluminum oxide which forms rapidly and naturally in air may be influenced by the cold-worked material. A full study of "carpeting" may require examination of the cold-worked surface for imbedded particles of polishing compound or for the presence of amorphous non-crystalline regions of the aluminum alloy. However, the present invention diminishes the problem by covering over surface variations and by providing for the nucleation of electroless 88Ni-12P growth without resorting to chemical pre-treatments which accentuate "carpeting".

The present invention overcomes the problem of "carpeting" of electroless 88Ni-12P and also serves to reduce the cost of memory disk manufacture by incorporating the results of experimentation and recent technical advances in materials science together with the general method described earlier by Nanis in U.S. Pat. No. 5,405,646.

The major steps of coating a disk with the several layers necessary for a thin film memory disk in accordance with the prior art are shown in FIG. 2. The aluminum alloy substrate (disk) is degreased, washed in an alkaline soap solution and then rinsed in water. It is then etched in a dilute mineral acid bath and is then rinsed. The surface is then prepared for electroless nickel plating of the 88Ni-12P layer by a double zincating process. The above-mentioned sequence is included for example only and has many variants such as single or triple zincating.

Glass, polished to a smooth finish, has been favored as an alternate substrate to replace aluminum alloys. As experience with glass substrates has accumulated, new problems have been recognized, some of which have been overcome by the addition of a layer of electroless nickel (88Ni-12P) on the glass. Starcke et al., U.S. Pat. No. 5,871,810, recommend a multi-step chemical procedure to activate glass, ceramic and glass-ceramic substrates for electroless nickel plating, involving dipping a substrate in a solvent containing a metallo-organic source of palladium followed by baking at 200 C to 600 C to remove solvent and fix an adhesion layer on the glass which is catalytic for the nucleation of electroless nickel deposition. Starcke et al. indicate that a layer of electroless nickel is desirable to completely encapsulate and seal a glass substrate in order to overcome a corrosive effect of naturally occurring alkaline metal ions in glass, termed "salt bloom". Starcke et al. also indicate that an encapsulating layer of 88Ni-12P beneficially provides an easily polished top layer, thereby overcoming polishing difficulties inherent with hard ceramic and glass-ceramic substrates.

Ross has addressed yet another difficulty encountered in the use of glass substrates for memory disks, namely the need to provide a textured region on the disk surface to aid the intended operation of flying heads and to prevent "stiction" when a head lifts off from the surface (U.S. Pat. Nos. 5,741,560, 6,143,375). Ross indicates that glass is difficult to texture controllably by chemical etching and is also difficult to texture by localized laser action. In U.S. Pat. No. 5,741,560, Ross describes a solution to the problem of laser texturing by providing a metallic initiation layer on an unpolished glass substrate which, in turn, initiates the growth of a polishable and texturable metallic layer by the process of electroless deposition. The general approach taken by Ross to solve the problem of laser texturing of glass substrates was earlier revealed by Nanis in U.S. Pat. No. 5,405,646, including materials for the initiation layer, method of sputtering to apply said initiation layers and subsequent electroless deposition of 88Ni-12P.

It will be appreciated by those skilled in the art that the teaching of U.S. Pat. No. 5,405,646 (issued 11 Apr. 1995) provides for a general application unlimited as to the selection of substrate material. Electroless 88Ni-12P has been found to be a useful top layer for glass substrates and it continues to be a practical choice for aluminum alloy substrates of the 5086 class. As mentioned, other strong, non-magnetic, polishable metal substrates may be considered for memory disk applications when coated according to the present invention, thus offering the opportunity for substantial cost saving.

SUMMARY OF THE INVENTION

It is an object of this invention to provide improved thin film magnetic disks or planar magnetic storage devices and their method of manufacture for high density data storage, in which substrates which have super smooth surfaces prior to application of thin film magnetic recording layer are used in a process to provide disks suitable for high density data storage. One advantage of the invention resides in the ability to accommodate artifacts, such as chemical and microstructural variations produced by the mechanical cold working, of pre-polished substrates as well as chemical variations due to inherent microstructural intermetallic inclusions.

It is another object of the invention to provide a lower cost method to manufacture a thin film magnetic disk or planar device which results from use of lower cost materials, simplified process controls, increased throughput and higher yield.

It is another object of the invention to provide a process in which the several wet chemistry surface preparation steps of prior art are replaced by a single vacuum sputter deposition step.

It is another object of the invention to provide a means whereby only one side of a thin film memory storage disk or planar card device may be activated selectively for a single-sided application of said disk or card.

These and other objects of the invention are achieved by depositing one or more thin layers by vacuum methods such as vacuum sputter deposition, vacuum evaporation from a source, etc. onto the super-smooth surface of a disk or device substrate such as aluminum, glass, ceramic or other suitable strong materials, said vacuum deposited layers to serve the purpose of binding to the substrate and providing a new surface which catalytically or reactively nucleates the electroless plating of nickel-phosphorus or related alloys. The addition of the thin layer of a few hundred Angstrom thickness or less by vacuum sputter deposition or other dry deposition techniques renders an otherwise inert substrate into one which readily initiates electroless nickel deposition.

More particularly there is provided a magnetic disk or device which comprises a super-smooth substrate with a metallic sputtered binder layer, formed directly on the substrate and a second layer of sputtered metal, which nucleates the electroless plating of a nickel alloy which, after polishing, becomes the support for a thin sputtered magnetic layer. The novel procedure of this invention uses equipment already familiar in the prior art of the disk manufacturing industry. This invention also permits the use of pre-polished substrate materials, and avoids an unwanted prior art roughening ("carpeting") of electroless nickel deposited on a prepolished smooth aluminum having characteristics of a cold-worked surface. This invention thereby affords substantial savings in the polishing of electroless nickel to the degree of smoothness required for close head-disk spacing.

As data density has increased through advances in head and disk technology, the number of disks (and heads) required has decreased. For example, one head and only one disk surface may replace multi-disk stacks which use for example five disks and nine heads in a stack of the disk drive.

Where a thinner disk drive device (low "form factor") is desired, the present invention provides a means to coat electroless nickel alloy selectively on only one side of a disk or planar card memory device. In vacuum sputtering practice for memory disks, two target sources of sputtered material are provided, one for each side. Sputter deposition can readily be limited to one planar surface of a disk or card by control of the appropriate power supply as the substrate advances into the zone of sputter deposition activity. Only the surface with a sputtered nucleating layer will initiate electroless nickel deposition, thereby eliminating the unused material which otherwise would be added by prior art wet processing which requires total immersion of the disk or planar surface. Since electroless nickel can be deposited essentially free of internal stresses, curvature of the single-sided disk will be minimal. It is noted that binder or other material layers may still be desirably sputtered onto the opposite side of the disk or planar card to assist in minimizing any tendency for curvature and also to provide a surface which does not initiate electroless nickel deposition.

Further, said layers on the opposite side may be selected to minimize any tendency for corrosion of the substrate in use.

As stated above, one of the objects of the present invention is to reduce manufacturing costs by a rearrangement of the steps of prior art, following the teaching of U.S. Pat. No. 5,405,646 supplemented by advances in materials science and in the understanding of the process of electroless deposition. It is noted that production methods tend to be "frozen" once they are made to work dependably, no matter how complex the procedures involved may be. Once a system works, there is a natural and understandable reluctance to change any part of the system, particularly when high volume production is underway. The present invention recognizes an alternate, hitherto unused pathway to capitalize on improved understanding of the fundamental chemistry of the "frozen" prior art and to use the same equipment of the "frozen" prior art but in a different sequence and thereby afford substantial cost benefits.

Prior art has evolved as an adjustment of the chemistry of zincating and electroless 88Ni-12P plating to accommodate the chemical and metallurgical structure of a specific class of aluminum alloys favored as a substrate for memory disks, typically alloys designated as 5086, 5186, 5585, CZ46 and the like. The present invention follows U.S. Pat. No. 5,405,646 by adding a thin non-magnetic layer, preferably by sputtering, onto a substrate, thereby creating a surface of uniform chemistry by masking microscopic inclusions whose chemical and electrochemical behavior are substantially different from that of the aluminum alloy matrix. The added thin non-magnetic layer may itself serve as a nucleant (reactive or catalytic) to induce growth of 88Ni-12P (or other compositions) upon immersion of the substrate into the wet chemistry of electroless deposition. A second layer may preferably be interposed by sputtering to serve as a binder between the substrate and the catalyst layer. The advent of cold-worked super finished pre-polished substrates has resulted in additional surface heterogeneities which cause the problem of "carpeting" when plated by prior art. However, the present invention also masks the effect of cold-work and prevents "carpeting".

Experimental results favor the use of a sputtered 88Ni-12P layer as the non-magnetic catalyst to initiate wet chemistry electroless deposition of additional 88Ni-12P in a subsequent step, in accord with U.S. Pat. No. 5,405,646. Since the prior art achieves nucleation of electroless deposition of 88Ni-12P by a thin layer of zinc added to the aluminum alloy substrate surface by wet chemistry, it follows that a sputtered layer of zinc will serve the same purpose, thereby replacing the several wet chemistry preparation steps of the prior art. The accumulation in the electroless nickel bath of dissolved zinc may limit the life of the electroless nickel bath, as cited in "Electroless Nickel Plating", W. Riedel, ASM International, ISBN 0-904477-12-6, page 52, Table 11. Accordingly, a sputtered catalytic layer of 88Ni-12P is preferred.

Chakrabarti et al., in U.S. Pat. No. 5,747,135 seek to reduce the cost of memory disk manufacture by eliminating the need for prior art zincating and chemical pre-treatment. Chakrabarti et al. propose to bypass these steps by adding to an aluminum alloy substrate a sputtered layer of non-magnetic nickel alloy whose purpose is to catalyze the electroless deposition of 88Ni-12P. The sputtered nickel alloys examined by Chakrabarti et al. include nickel-molybdenum, nickel-vanadium and nickel-tungsten, each in the composition range recommended by Nanis, U.S. Pat. No. 5,405,646. An extra step of annealing is called for in U.S. Pat. No. 5,747,135 to promote bonding between the substrate and the 88Ni-12P deposit. As determined by bend testing of substrates treated by the method of the present invention, adhesion between substrate and deposited electroless nickel is excellent.

The present invention facilitates the replacement of prior art aluminum alloy substrates by less expensive high-strength aluminum alloys or by other materials selected mainly for their mechanical characteristics. By adding a layer of electroless nickel to new substrate materials, a dual advantage is possible. Firstly, novel high strength substrates may permit higher rotational speeds and thinner disks with reduced mass, thus requiring less power for drive motors and/or an increased number of disks in a stack. Secondly, the addition of a layer of electroless nickel affords the advantage of a well-tried and tested surface for prior art fine polishing with familiar technology and also a surface known to be compatible with the sputtering steps used for adding magnetic layers (e.g. chromium underlayer, cobalt alloy magnetic layer, carbon overcoat). In other words, the familiar second and third steps (WET-DRY) of prior art can be continued in use even with novel high-strength substrates, thus gaining an advantage in speeding novel substrate disk products to market. The burden is thus eliminated for defining best conditions for adhesion and orientation of said magnetic layers if they were to be sputtered directly onto the novel substrate. Those skilled in the art of polishing and burnishing will recognize that a variety of techniques are available to produce super-smooth finishes on novel substrate materials. The binder and catalyst layers added by the present invention will preserve the finish of the substrate, which will in turn be preserved as the electroless nickel layer grows, thus requiring minimal polishing and thereby reduced cost. Also, the smoother electroless nickel layer may be plated thinner than in prior art, conferring additional cost saving. Persons skilled in the art of sputtering will recognize that the binder layer of the present invention, such as chromium, is a suitable means to promote adhesion to metals which have thin naturally occurring protective oxide layers on their surface, such as titanium and its alloys. Chromium is also an effective binder layer to glass and ceramic materials.

As disk technology evolves, new improvements have generally been accompanied by new problems to be overcome. As already noted, in order to meet the requirements of low flying heights (one microinch or less), pre-polishing of aluminum alloy substrates to provide super-smooth substrates has provided smooth surfaces but has also mechanically induced non-uniform chemical behavior in the preparation and plating steps of the prior art.

A super smooth substrate as the phrase is used herein refers to a substrate having an average surface roughness Ra in the range of about 30 Angstroms or smoother, or more preferably in the range of about 20 Angstroms or smoother. Measurements of average surface roughness at this level of smoothness are difficult, thus an Ra of about 30 Angstroms encompasses smoothness in a range of 30 Angstroms plus or minus measurement uncertainties of around 15% to 25%. Similar or even greater measurement uncertainties apply to smoother results. According to one embodiment, the super smooth substrate is manufactured, for example, by a fixed-pad abrasive polishing, with a resultant cold-working of the surface.

The present invention masks artifacts of the processes used to provide a substrate having a super smooth surface, such as mechanically induced chemical variations believed to be induced by cold-working, which result in uneven patchy 88Ni-12P plating ("carpeting" or "wall effect") and also masks the inherent microstructural chemical differences attributed to intermetallic compound particles in prior art aluminum alloys. The present invention also avoids roughness as induced by the etch baths of the first WET step of prior art.

For the aluminum alloys used in prior art, the present invention permits the zincate surface preparation steps of the prior art to be completely bypassed, thereby conferring cost savings from
1) elimination of chemicals used for acid etch and zincating;
2) elimination of purified water required for rinsing in pre-treatment etch and zincate steps;
3) increased yield of product by decreasing number of process steps;
4) elimination of waste rinse water treatment;
5) elimination of need to safely dispose of spent process chemicals;
6) less 88Ni-12P deposit required, permitting increased throughput and longer-life electroless nickel bath;
7) smoother 88Ni-12P deposits, thus reducing the amount of polishing required;
8) reduced amounts of polishing compounds and purified water required to mix polishing slurries;
9) reduced amount of purified water needed for rinsing polished substrates;
10) reduced requirement for treatment and safe disposal of spent polishing compound mixed with rinse water.

A major component of cost in the prior art is the polishing step (second WET step). Present practice favors the use of two polishing stages, with a first abrasive of alumina slurry and a second stage of fine polishing with colloidal silica. The positioning of plated disks on polishing pads is labor intensive as is also their removal and thorough rinsing at the end of polishing. An estimate of the cost of two-stage prior art polishing indicates it is 20 to 25% of processing costs, or even greater when yields are factored into the estimate. The present invention offers a good opportunity for significant reduction of the polishing cost.

The multiple steps of the prior art surface preparation are eliminated in the present invention and are replaced by a single step, increasing the opportunity for greater yields. Briefly stated, in the prior art, soap rinse and mild acid etches are considered to remove or neutralize the effect of intermetallic inclusion before double zincate steps. The first alkaline zincate solution chemically dissolves aluminum oxide from the surface of the aluminum alloy disk, exposing aluminum which automatically receives a partial deposit of zinc through an electrochemical replacement reaction. Surface roughening can occur in these stages of pre-treatment plus the additional roughening associated with "carpeting" on pre-polished aluminum alloy substrates.

After the first zincate dip, the disk is rinsed in water, placed in a nitric acid solution to remove the first zinc deposit, is again rinsed in water and is then again immersed in an alkaline zincate solution. The surface becomes more completely covered by zinc in the second zincate immersion. The disk is then rinsed in water and immersed in an electroless nickel plating solution to grow a 88Ni-12P layer. The time-temperature-concentration parameters of the pre-treatment etch and double zincate steps are tailored to the chemical nature of the aluminum alloy substrate. Inadequate rinsing and cross contamination of baths can lead to imperfect prior art 88Ni-12P plating such as the formation of non-adherent blister regions.

In the prior art sequence, the 88Ni-12P layer is plated extra thick and the rough nodular surface is then partially removed by polishing in the second WET step so that the remaining layer is completely dense, with a smooth surface. Whereas the prior art sequence is WET-WET-DRY, comprising WET substrate preparation (pre-treatment), WET electroless plating and polishing and DRY (vacuum-sputtered) magnetic layer, the present invention replaces WET substrate preparation with DRY vacuum sputtering of a nucleating layer, making a new sequence of DRY-WET-DRY. Despite the substitution of vacuum sputtering to replace wet chemical surface preparation steps, the second and third steps (WET-DRY) remain identical to prior art.

BRIEF DESCRIPTION OF THE FIGURES

The invention will be more clearly understood from the following description when read in connection with the drawings of which.

DETAILED DESCRIPTION

Figure 1:
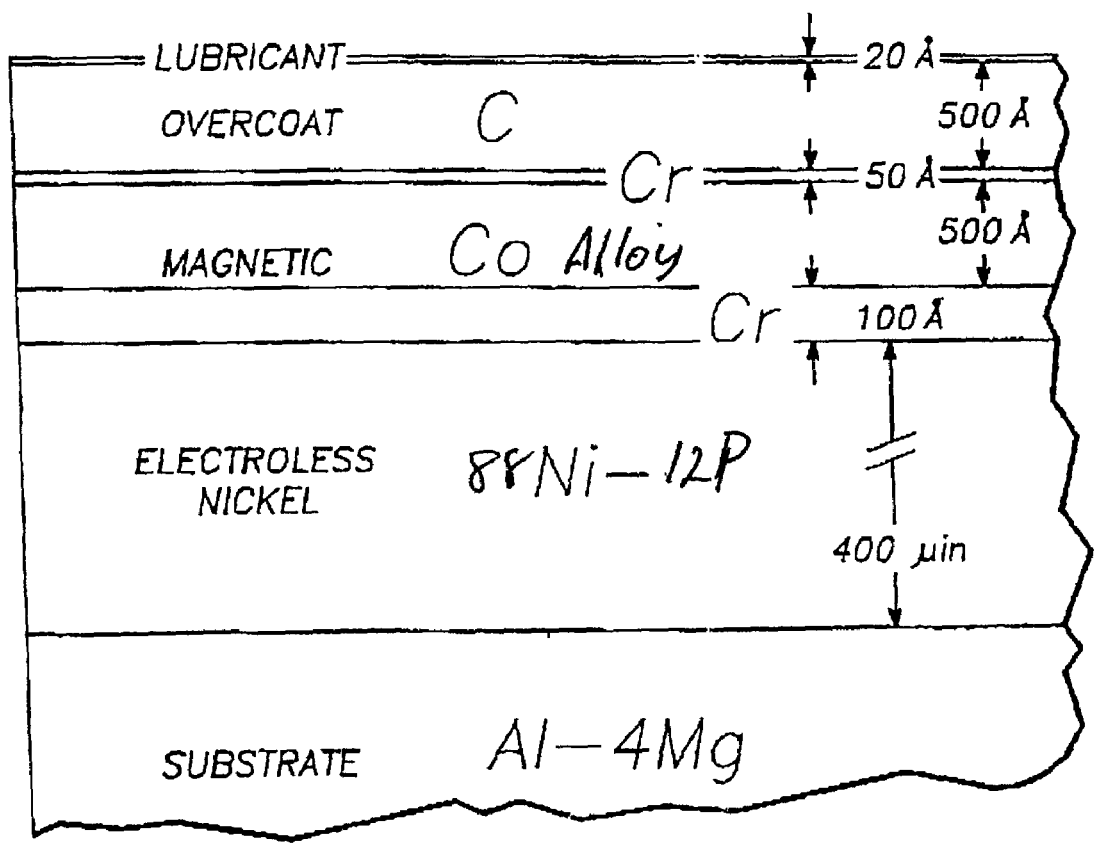
FIG. 1 is an enlarged cross sectional view of a portion of a thin film magnetic disk in accordance with the prior art.
Figure 2:
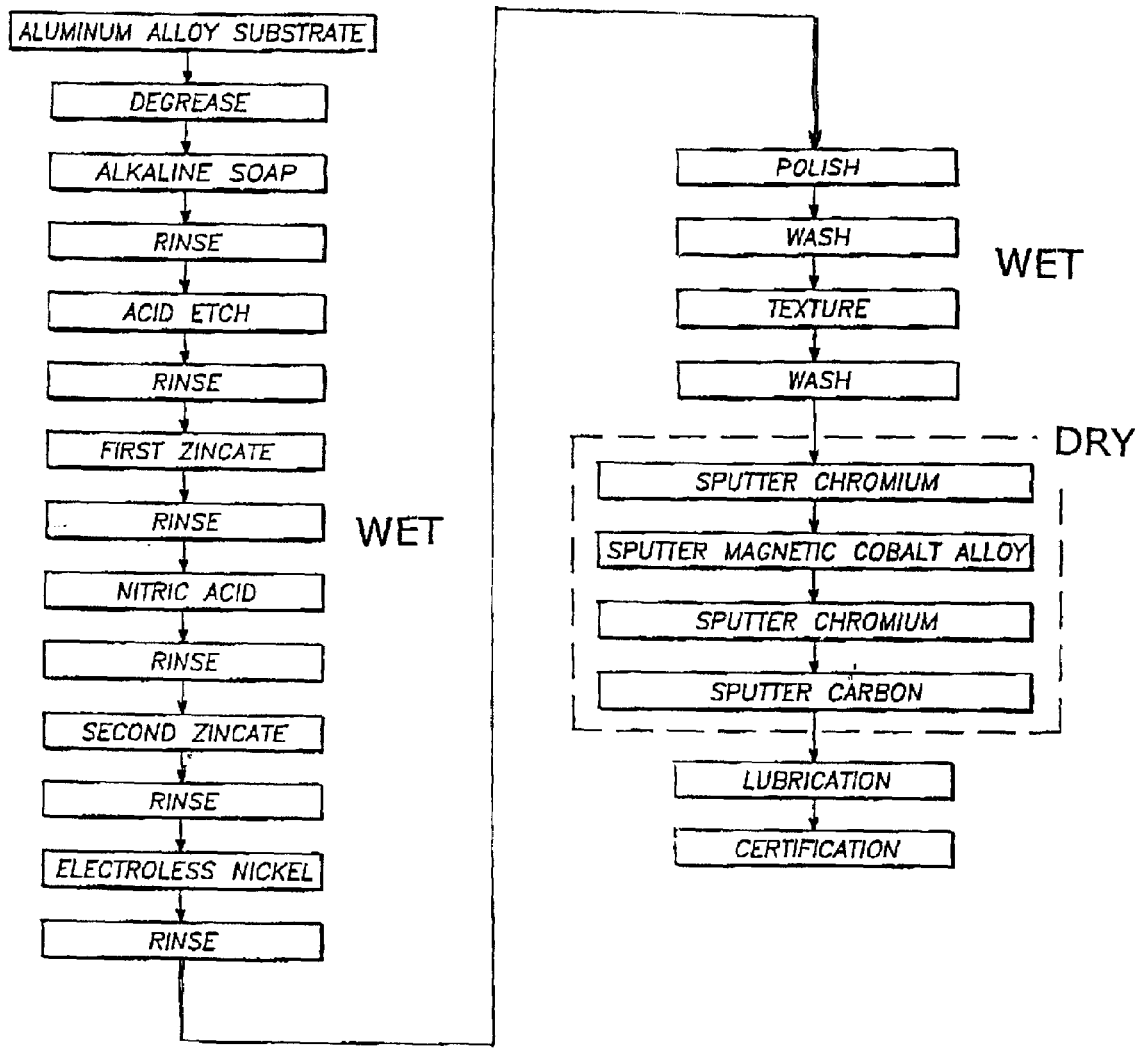
FIG. 2 is a flow chart showing the WET-WET-DRY steps of manufacturing the prior art disk of FIG. 1.
Figure 3:
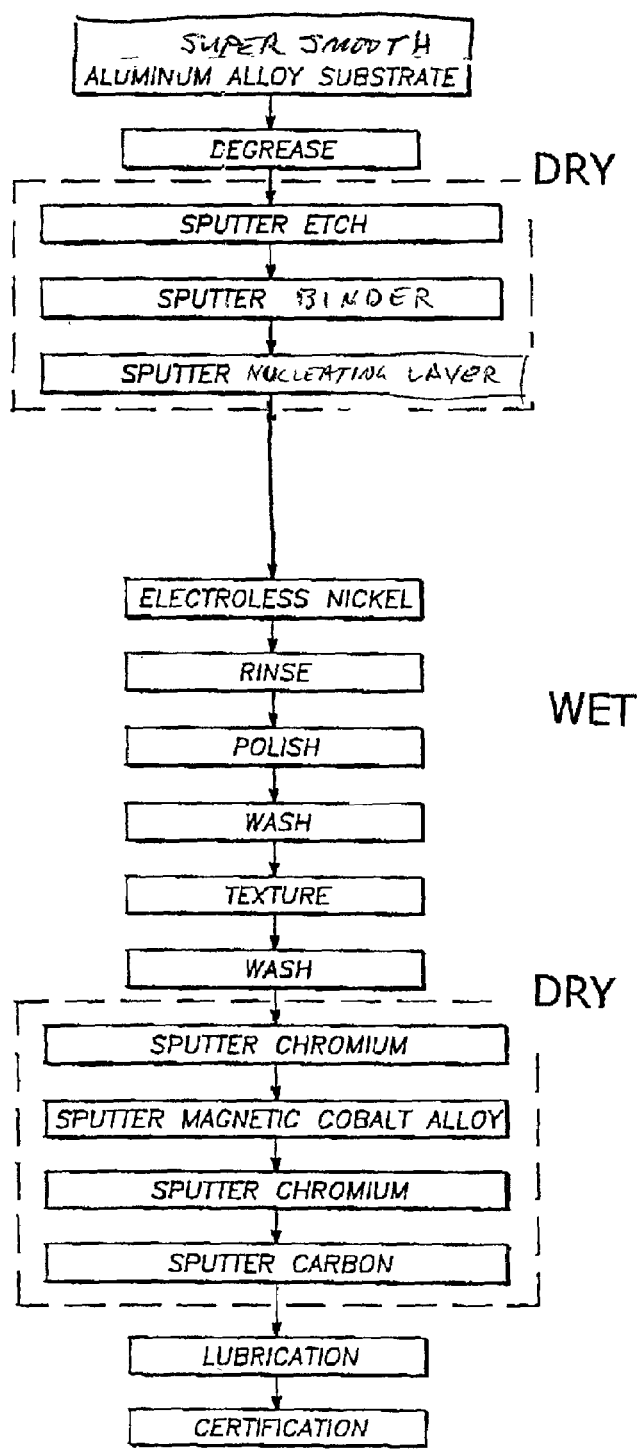
FIG. 3 is a flow chart showing the DRY-WET-DRY steps of manufacturing a disk or planar device in accordance with the invention.

In accordance with the present invention, FIG. 3, a super smooth aluminum alloy substrate (disk or planar device) is first degreased by organic solvents, as in the prior art. The substrate is then moved into a vacuum sputtering system designated by the dotted block. Vacuum sputter deposition systems are well known. Suffice to say that in such systems, the substrate is placed in an evacuated enclosure for processing. The first step may be to further clean the surface by reverse sputter etching. In accordance with an embodiment of the invention, a first layer, 21, FIG. 5, of material selected to bind with the aluminum surface is vacuum sputter deposited onto the surface. This is followed by vacuum sputter deposition of a second layer 22 which serves as the catalytic or reactive nucleating layer for the subsequent electroless plating of a 88Ni-12P layer.

Pure chromium, pure titanium or tungsten—titanium alloy are preferred for the binder layer materials. Zirconium, vanadium, niobium, molybdenum, tantalum, tungsten, copper and rhenium as well as alloy combinations of these and other elements may also be vacuum sputter deposited onto the aluminum disk as a first layer. The first (binder) layer covers over the chemical non-uniformities associated with cold-worked pre-polished aluminum alloy and also the imbedded inclusions of intermetallic particles. The binder layer adheres firmly to the aluminum and also to the second sputtered nucleating layer.

The second or nucleating vacuum sputtered layer is selected to:
1) bond tightly to the first binder layer;
2) cover over inclusions and non-homogeneous substrate regions;
3) resist oxidation during storage;
4) preferably be non-magnetic or
5) not interfere with the magnetic field of the read-write head;
6) catalytically or reactively nucleate the deposition of 88Ni-12P
7) bond with the electrolessly deposited 88Ni-12P layer.

The most important requirements are the ability to nucleate 88Ni-12P plating upon immersion in the electroless nickel bath and to be non-magnetic. As an example of nickel alloy recommended by Nanis U.S. Pat. No. 5,405,646, a thin catalytic layer of nickel-phosphorus alloy with from 8.5 to 12 weight percent phosphorous is a preferred material for sputtering onto either bare aluminum or onto a first sputtered binder layer such as chromium. Sputtering targets of nickel-phosphorus alloy may be prepared by the prior art process or, more preferably, by powder metallurgical techniques, available, for example, from Heraeus MTD Specialty Products Group, Chandler Ariz.

Zinc is also a preferred material for sputtering as a reactive thin layer onto either bare aluminum or onto a first sputtered binder layer such as chromium, recognizing, however, that reacted and dissolved zinc will accumulate in the electroless nickel bath.

Pure nickel is an effective catalytic nucleating layer and, if the aluminum alloy surface is smooth, the growth of 88Ni-12P will continue as a smooth surface. Although pure nickel is magnetic, the sputtered nucleating layer may be made sufficiently thin and remote from the field of the read-write head so as to be of negligible influence.

It is to be understood that although the invention is directed in connection with vacuum sputtering, the thin nucleating and binder layers may be deposited by other techniques such as chemical vapor deposition and physical chemical vapor deposition, evaporation and the like.

As discussed and described above, the first and second layers cover and mask the chemical and physical non-uniformities of the substrate and reduce their tendency to produce non-uniform 88Ni-12P deposition. In this way, the chemistry of the aluminum alloy has minimal influence on subsequent 88Ni-12P deposition. Since the invention masks the chemical and metallurgical differences in the aluminum alloy, such as those which produce the "carpeting effect", it may be possible to use less expensive alloy grades. Also, glass, ceramic and polymeric substrates can be coated with 88Ni-12P by the present invention. For example, the first (binder) layer may be chromium or titanium, each of which each bonds well to both glass and ceramic materials. U.S. Pat. No. 5,405,646 provides a way to use available metals as new substrate materials, selected for their mechanical strength and ability to be polished to a very smooth surface, thus permitting the use of thinner disks. Lightweight titanium or magnesium or beryllium or their alloys may also find use as substrates (disk or planar device), as well as non-magnetic austenitic stainless steel compositions, manganese steel and beryllium copper or other high-strength, non-magnetic materials known to skilled practitioners of materials arts and sciences.

Once nucleated, the electroless 88Ni-12P deposit continues to grow uniformly with a smooth surface. The as-deposited surface may be sufficiently smooth so as to require minimum polishing, thus requiring less waste treatment of spent polishing slurry and rinse water. The present process offers additional ecological advantages. Waste water treatment is reduced by eliminating rinse stations in the WET surface preparation sequence of prior art. Waste treatment of spent etch, concentrated alkaline zincate and concentrated nitric acid solutions is also eliminated.

Thus there has been described an improved method of manufacturing thin film magnetic disks and planar devices. In summary, the DRY-WET-DRY sequence of vacuum sputter deposition of a thin nucleating layer followed by improved wet process electroless nickel plating and polishing followed by prior art vacuum sputter deposition of the magnetic layer provides an improved process for the manufacture of magnetic disks with the possibility of cost savings. A further advantage of the novel DRY-WET-DRY process permits the use of prior art equipment to add well-proven electroless nickel to a wide variety of disk or planar substrates including glass, metal, ceramic and polymer plastics as well as to highly polished aluminum alloys or other suitable metals.

Yet a further advantage is the capability to selectively coat a disk or planar card on one side only with a nucleating layer by vacuum sputter deposition and thus provide a device with a single-sided electroless nickel to be then followed by single-sided polishing, if required, and single-sided addition of magnetic layers (final DRY step).

In a preferred embodiment, amorphous, non-magnetic sputtered 88Ni-12P acts as a catalytic nucleating layer to trigger the electroless deposition of 88Ni-12P, and adhesion is enhanced by bonding with a first sputtered binder layer such as chromium. Super-smooth disks of alloy 5585, 3.5 inch diameter, 0.050 inch thick were first sputtered with a binder layer of chromium, 300 Angstrom thick, followed by 300 Angstrom of 88Ni-12P in an Intevac disk coating system. After sputtering, the disks were immersed in a standard electroless nickel plating bath (OMG-Fidelity), with no special attempt to activate the surface. The sputtered layer of 88Ni-12P smoothly nucleated the growth of electroless 88Ni-12P, which achieved a thickness of 375 microinches in one hour. The plated layer had excellent adhesion, as tested by bending a sample disk about a diameter line (without a supporting mandrel) to an angle of 180 degrees. A control substrate, treated by the prior art, had a comparable adhesion.

The roughness (or micro-waviness) of disk surfaces was measured by doppler laser vibrometry (THOT Technologies, Inc. model 4224M) and also by a MicroXAM (Phase Shift Technology, Inc.) optical device and is conveniently represented by the parameter Ra, the arithmetic average deviation of the surface profile. There was little or no change of surface roughness for a 5585 alloy substrate treated by the method of the present invention. With a sputtered binder layer of 300 Angstrom of chromium and nucleating layer of 300 Angstrom of 88Ni-12P, the initial Ra was 21 Angstrom, representative of a pre-polished super finish substrate. After electroless plating of 375 microinches of 88Ni-12P, Ra was 23 Angstrom. In contrast, there was a threefold increase of micro-waviness on control disks given prior art wet chemical pre-treatment and plating to a comparable thickness of electroless nickel in the same plating bath. Roughness values were Ra=65 Angstrom and 77 Angstrom for control substrates, close to a reported (OMG Fidelity) value of Ra=81 Angstrom characteristic of "carpeted" deposits.

Another related embodiment of the present invention has a sputtered chromium binder layer thickness of 1000 Angstrom with a sputtered 300 Angstrom nucleating layer of 88Ni-12P. Yet another related embodiment has a sputtered chromium binder layer 300 Angstrom thick with a 1000 Angstrom thick sputtered nucleating layer of 88Ni-12P. For all these related embodiments, surface roughness was essentially unchanged after electroless deposition of 375 microinches of 88Ni-12P, as determined by doppler laser vibrometry (THoT Technologies, Campbell Calif., model 4224M). Nucleation of growth occurred smoothly, without delay when the present invention substrates were immersed in the identical plating bath used for prior art control substrates. Those skilled in the art will recognize the advantage of polishing electroless nickel with a roughness unchanged from that of the initial substrate i.e. without the threefold roughening induced by prior art pre-treatment and the added non-uniform etching and plated "carpeting" which accompanies pre-polished cold-worked substrates.

In another embodiment of the present invention, a uniform thin layer of zinc is added to the aluminum substrate by a DRY process of vacuum sputtering. After removal of the substrate from the vacuum apparatus and subsequent immersion in the electroless nickel solution, the zinc layer serves to reactively nucleate the growth of 88Ni-12P. Those skilled in the art will recognize that zinc may also be added by other processes such as vacuum vaporization. However, vacuum sputtering is preferred because it offers close control of thickness and also because disk sputtering systems can readily be arranged to deposit a binder layer between the aluminum and the zinc layer. An initial sputtered binder layer such as chromium will serve to bond the sputtered zinc layer and also to cover over the chemical and physical variations of the aluminum substrate.

In another embodiment of the present invention, the sputtered layer is comprised of pure nickel with thickness less than 100 Angstroms, preferably, on a binder layer of chromium. Upon immersion in the electroless nickel solution, the sputtered nickel layer or partial layer catalytically nucleates deposition of 88Ni-12P layers. It is recognized that pure nickel is magnetic but its effect is masked by the overlayer of electrolessly plated non-magnetic 88Ni-12P.

It is noted that the practice of thin film sputtering is a key aspect of memory disk manufacture and that the present invention calls for the use of equipment available and familiar to those who practice the art of memory disk manufacture. The DRY step of sputtered magnetics and overcoat in the manufacture of the memory disks is described in more detail in U.S. Pat. No. 5,405,646.

Figure 4:
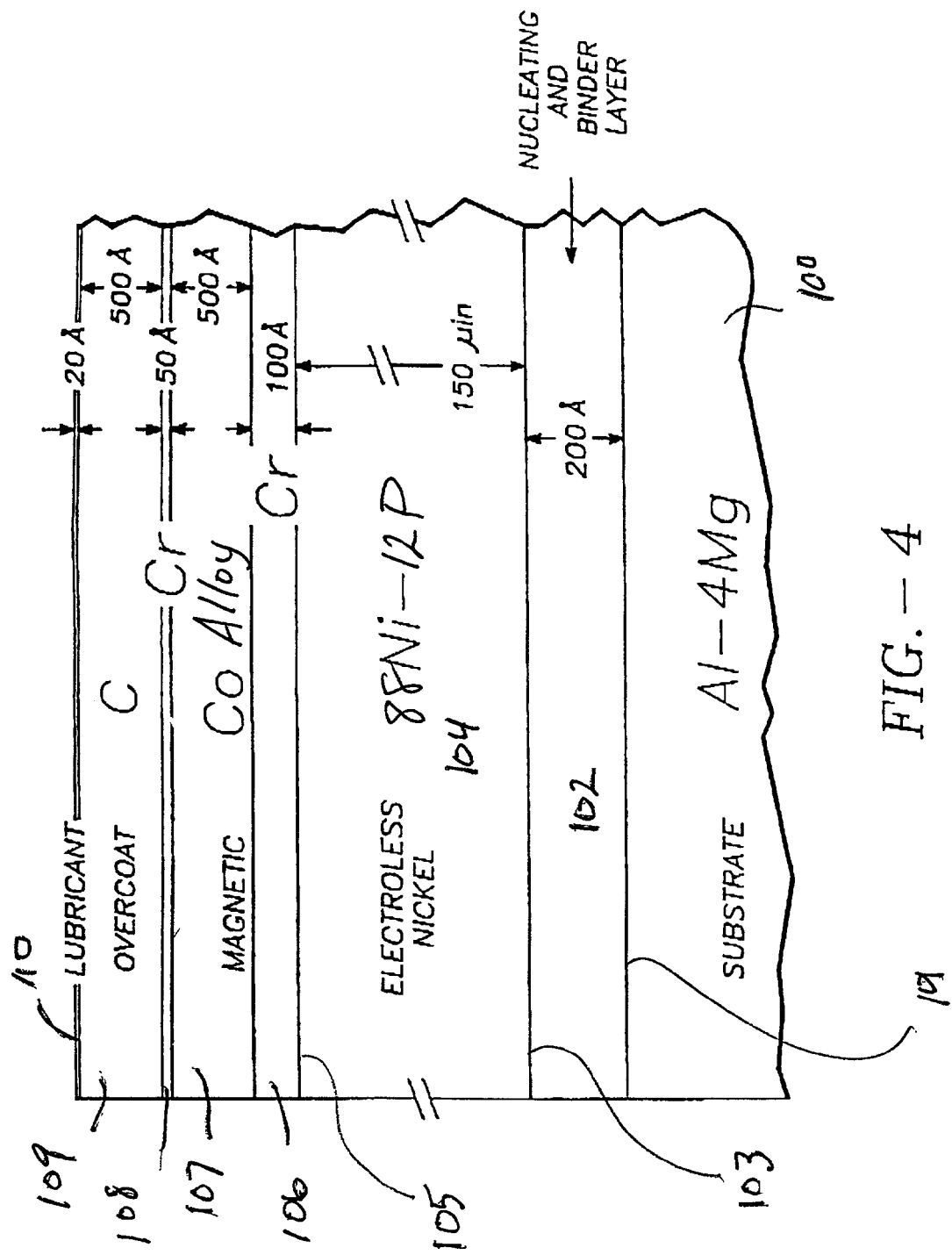
FIG. 4 is an enlarged cross-sectional view of a portion of a disk or planar device manufactured in accordance with one embodiment of the invention; wherein the thin sputtered layer is a dual purpose single material, serving both as binder and also as catalyst to nucleate a 88Ni-12P deposit.

FIG. 4 illustrates the layers of material on one side of a magnetic storage device going to one embodiment of the invention. In this example, the substrate 100 comprising aluminum magnesium alloy which has been processed to create a super smooth surface 101, such as by a fixed-pad polishing process. A nucleating and binding layer 102 is formed on the super smooth surface 101 of the substrate. The nucleating and binding layer has a surface 103 on which a electroless nickel layer 104 is formed. The electroless nickel layer 104 has a super smooth surface 105 as deposited. After additional polishing in the preferred embodiment, a chromium layer 106 followed by a magnetic cobalt alloy layer 107 and a thin chromium layer 108 are formed on the device. A carbon overcoat layer 109 and a lubricant layer 110 complete the device.

Figure 5:
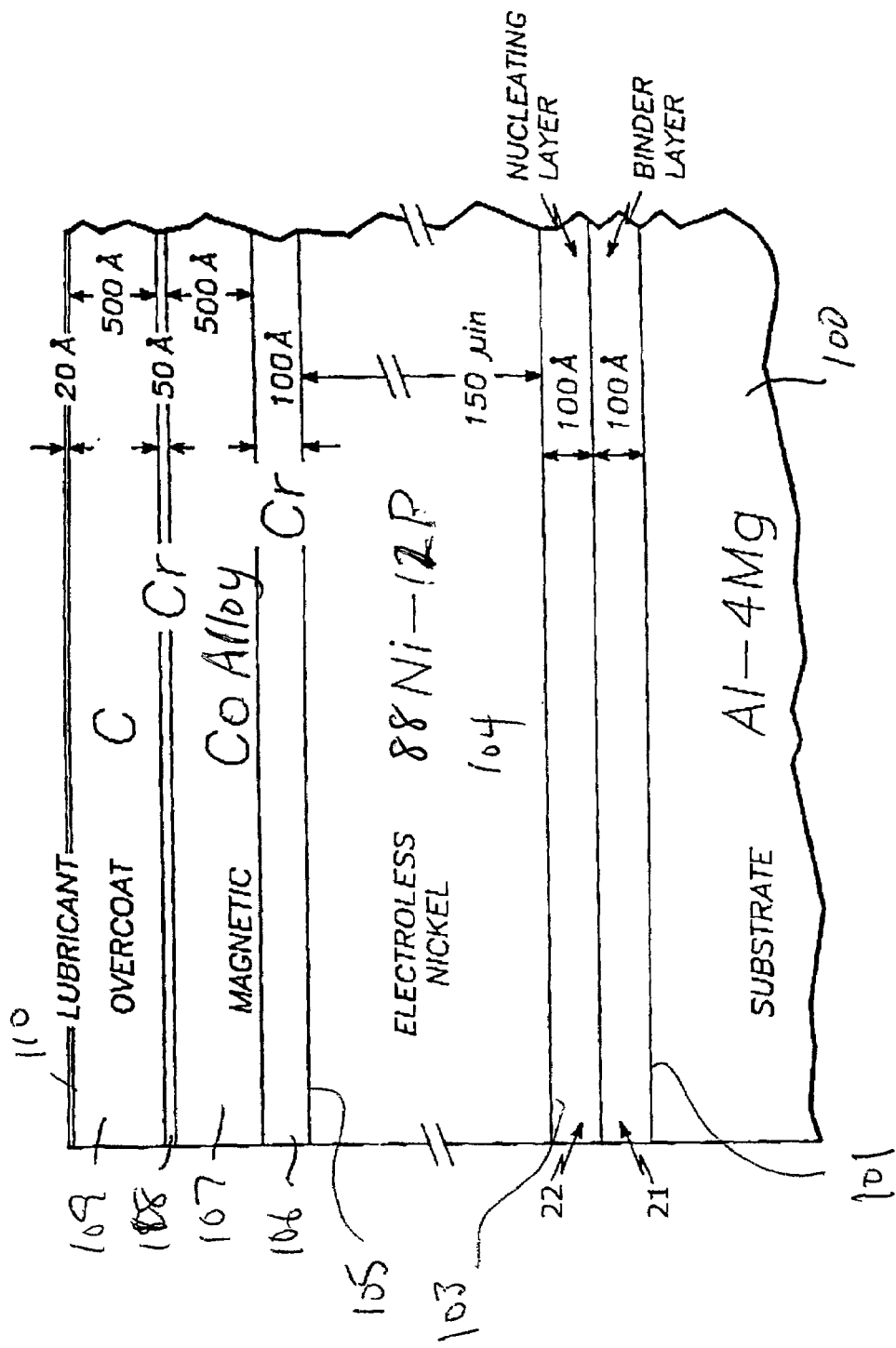
FIG. 5 is an enlarged cross sectional view of a portion of a disk manufactured in accordance with another embodiment of the invention in which a binder layer is first sputtered onto the disk or planar device, followed by a sputtered layer which has catalytically nucleated a 88Ni-12P deposit.

FIG. 5 illustrates the layers of material on one side of a magnetic storage device going to a second embodiment of the invention. In this example, the substrate 100 comprises an aluminum magnesium alloy which has been processed to create a super smooth surface 101, such as by a fixed-pad polishing process. A binding layer 21 is formed on the super smooth surface 101 of the substrate. A nucleating layer 22, is formed on the binding layer. The nucleating layer 22 has a surface 103 on which a electroless nickel layer 104 is formed. The electroless nickel layer 104 has a super smooth surface 105 as deposited. After additional polishing in the preferred embodiment, a chromium layer 106 followed by a magnetic cobalt alloy layer 107 and a thin chromium layer 108 are formed on the device. A carbon overcoat layer 109 and a lubricant layer 110 complete the device.

Figure 6:
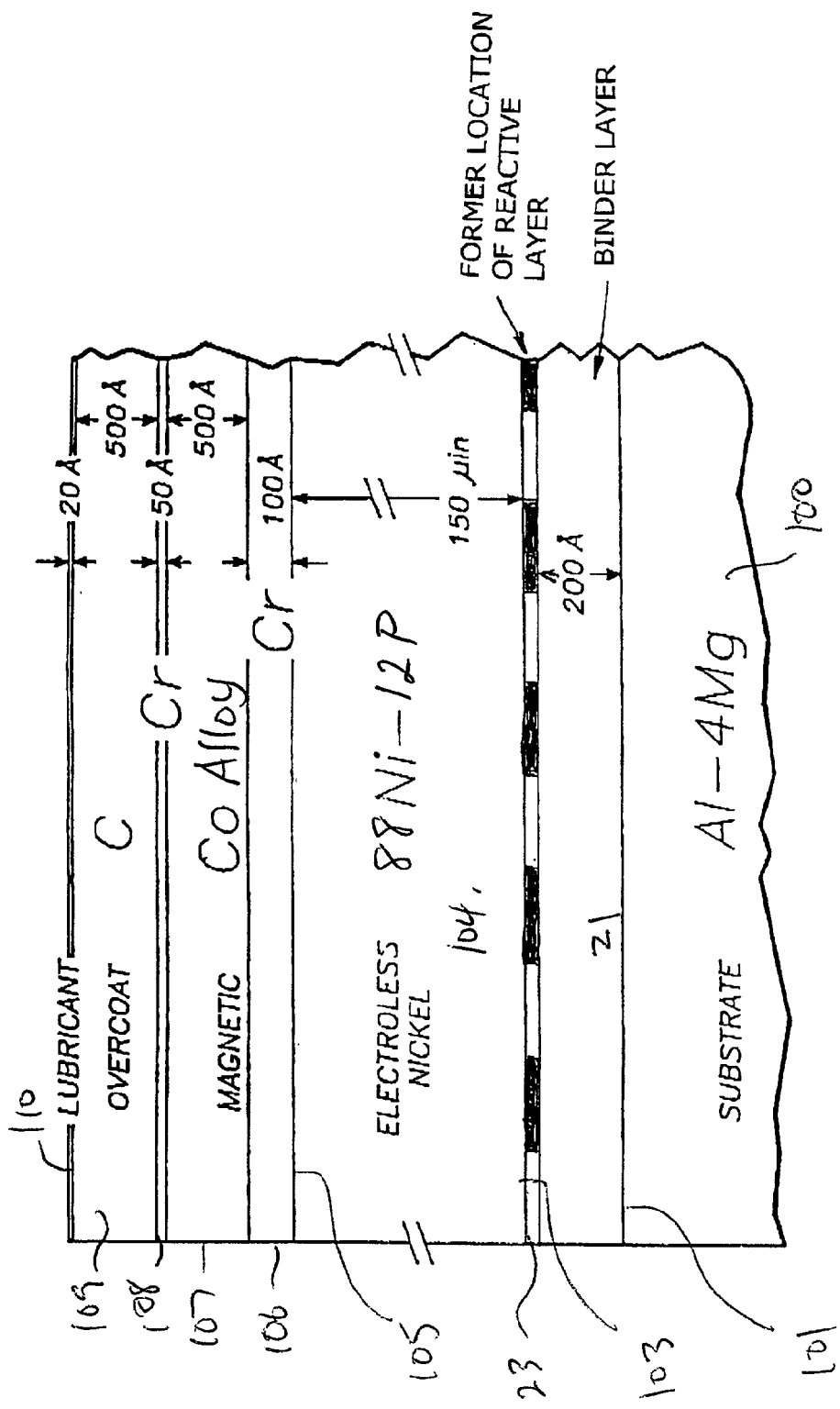
FIG. 6 is an enlarged cross sectional view of a portion of a disk manufactured in accordance with another embodiment of the invention in which a reactive layer such as zinc sputtered onto a first sputtered binder layer has sacrificially reacted to nucleate a 88Ni-12P deposit.

FIG. 6 illustrates the layers of material on one side of a magnetic storage device going to a third embodiment of the invention. In this example, the substrate 100 comprises an aluminum magnesium alloy which has been processed to create a super smooth surface 101, such as by a fixed-pad polishing process. A binding layer 21 is formed on the super smooth surface 101 of the substrate. A sacrificial nucleating layer 23 is formed on the binding layer. The nucleating layer 23 is essentially consumed in this example in the electroless nickel deposition process, which results in a surface 103 on which a electroless nickel layer 104 is formed. The electroless nickel layer 104 has a super smooth surface 105 as deposited. After additional polishing in the preferred embodiment, a chromium layer 106 followed by a magnetic cobalt alloy layer 107 and a thin chromium layer 108 are formed on the device. A carbon overcoat layer 109 and a lubricant layer 110 complete the device.

Figure 7:
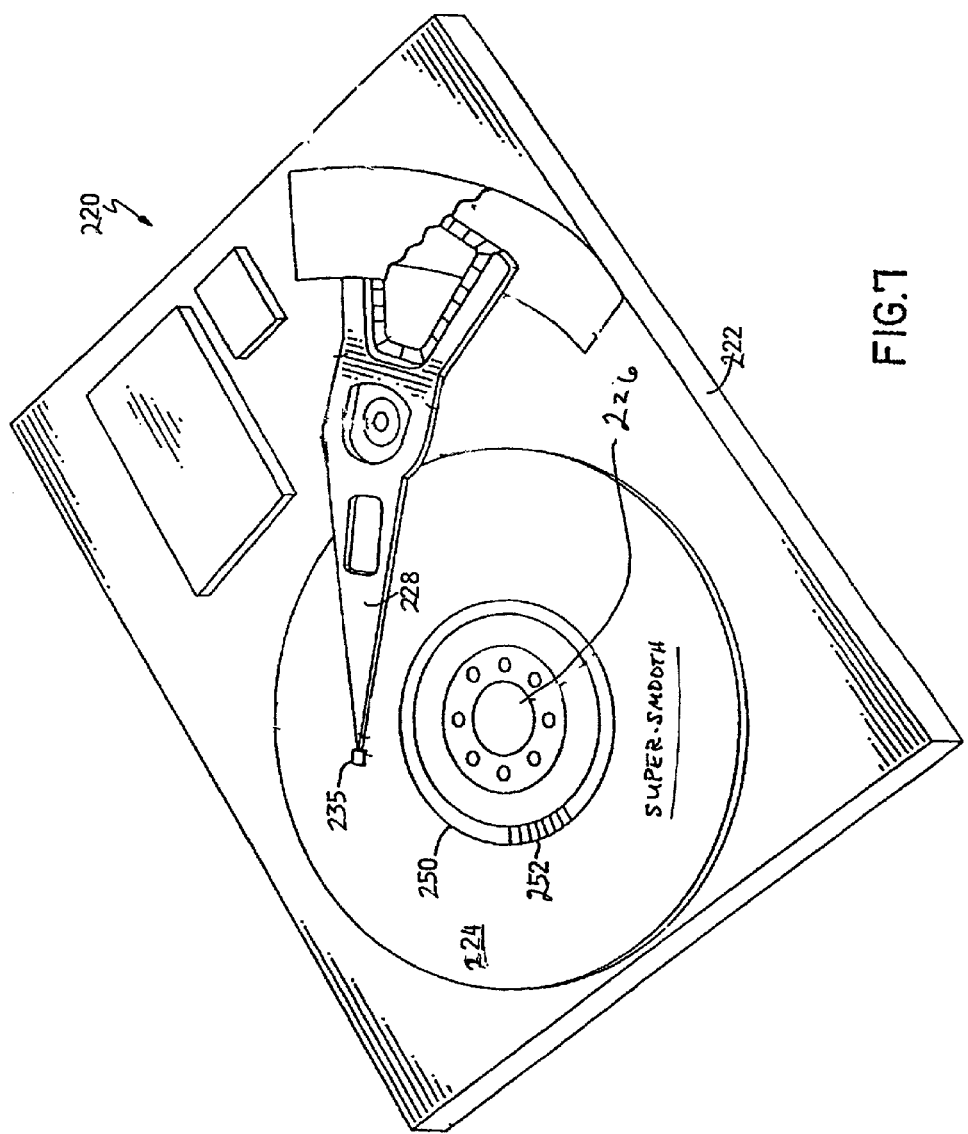
FIG. 7 is a simplified diagram of a disk drive system including a motor and head assembly with a super smooth magnetic disk according to the present invention.

Referring now to FIG. 7, there is shown a data storage system 220 with the cover removed from the base 222. The data storage system 220 typically includes a disk drive motor and head assembly, and one or more rigid data storage disks 224 which are stacked coaxially in a tandem spaced relationship, and rotate about a spindle motor 226 at a relatively high rate of rotation. The disk 224 is manufactured according to the process described above, using a super smooth substrate, and which after the plating of electroless nickel, is given a final polish to achieve a final surface roughness Ra of 5 Angstroms or less, in preferred embodiments. Each disk 224 is typically formatted to include a plurality of spaced concentric tracks 250, with each track being partitioned into a series of sectors 252 which, in turn, are further divided into individual information fields. One or more of the disks 224 may alternatively be formatted to include a spiraled track configuration. In one embodiment, only one disk, and one surface of the disk, are used.

An actuator typically includes an actuator arm 228, with the arm having one or more transducer and slider body assemblies 235, known as heads, for reading and writing information to and from the data storage disks 224. Alternative embodiment include a plurality of interleaved head assemblies for a corresponding plurality of disk surfaces. The assembly 235 is typically designed as an aerodynamic lifting body that lifts the transducer to hover above the disk 224 on an air bearing or airflow patterns produced by high-speed disk rotation. A conformal lubricant (110 in FIGS. 4 and 5) may alternatively be disposed on the surface of the disk 224 to reduce static and dynamic friction between the head assembly 235 and the disk 224.

A typical data storage system includes one or more data storage disks coaxially mounted on a hub of spindle motor 226. The spindle motor rotates the disks at speeds typically on the order of several thousand revolutions-per-minute. Digital information, representing various types of data, is typically written to and read from the data storage disks by one or more transducers, or read/write heads, which are mounted to an actuator and passed over the surface of the rapidly rotating disks.

The actuator typically includes one or a plurality of outwardly extending arms with one or more transducers being mounted resiliently or rigidly on the extreme end of the arms. For multiple disk stacks, the actuator arms are interleaved into and out of the stack of rotating disks, typically by means of a coil assembly mounted to the actuator. The coil assembly generally interacts with a permanent magnet structure, and the application of current to the coil in one polarity causes the actuator arms and transducers to shift in one direction, while current of the opposite polarity shifts the actuator arms and transducers in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current through the rite element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. The method of manufacture of magnetic disks and other planar magnetic memory devices which include a metal substrate which carries a magnetic film deposited on the surface of an electroless plated nickel alloy layer, the improvement comprising the steps of providing a metal substrate having a cold worked surface, characterized by microstructural mechanical variations at and below the surface resulting from smoothing processes and with an average surface roughness of less than about 30 Angstroms, and vacuum-sputter deposition of a metallic layer onto the surface of the substrate, said metallic layer selected to bind to the substrate, thereby masking said microstructural mechanical variations of the substrate, and to reactively or catalytically nucleate the electroless plating of said nickel alloy in a subsequent wet chemistry step, depositing a nickel alloy layer by electroless plating on said metallic layer, the nickel alloy layer having surface roughness essentially unchanged from that of the cold worked surface of the metal substrate upon completion of the electroless plating, preparing the nickel alloy layer if necessary for formation of a magnetic layer thereon, and depositing a magnetic layer over the nickel alloy layer.

2. The method of claim 1 in which the substrate is an aluminum alloy and the nickel alloy layer is a nickel-phosphorus alloy.

3. The method of claim 1 in which the reactive nucleating layer is a sacrificial reactive metallic layer of zinc.

4. The method of claim 1 in which the catalytically nucleating metallic layer is a non-magnetic nickel-phosphorus alloy or a non-magnetic alloy of iron or of cobalt or of nickel in combination with singly or multiply added alloying materials.

5. The method of claim 1 in which said nucleating metallic layer comprises a first non-magnetic binder layer which bonds to the substrate and a top second non-magnetic layer which bonds to the first layer and which nucleates the electroless plating of the nickel alloy either reactively, or catalytically.

6. The method of claim 5 in which the binder layer is selected from the group comprising chromium, titanium, alloy mixtures of chromium and titanium, alloy mixtures of chromium and vanadium and, alloy mixtures of titanium and tungsten.

7. The method of claim 5 in which said binder layer is selected from the group comprising zirconium, niobium, rhenium, vanadium, molybdenum, tungsten, chromium, nickel, copper, titanium, silicon or alloy combinations of these elements.

8. The method of claims 1 or 5, wherein said substrate is an aluminum alloy.

9. The method of claims 1 or 5 in which the substrate is a light-weight high-strength metal selected from the group of magnesium and its alloys or titanium and its alloys or other non-magnetic alloys as typified by beryllium copper, manganese steel and austenitic stainless steels.

10. The method of claims 1 or 5 wherein said substrate has a first side and a second side, and said nucleating layer is applied to only said first side of said substrate.

11. The method of claim 1, wherein the average surface roughness is about 20 Angstroms or less.

12. The method of claim 1, including polishing said layer of said nickel alloy.

13. The method of claim 1, including polishing said layer of said nickel alloy, forming a chromium layer on said layer of nickel alloy, and forming a magnetic layer on said chromium layer.

14. The method of claim 5 in which the first thin, non-magnetic binder layer promotes adhesion between the substrate and the top second non-magnetic layer.

* * * * *